(12) United States Patent
Spies

(10) Patent No.: US 6,511,745 B2
(45) Date of Patent: Jan. 28, 2003

(54) ADHESIVE PACKAGING TAPES

(75) Inventor: Manfred Spies, Bad Bramstedt (DE)

(73) Assignee: tesa AG, Hamburg (DE)

( * ) Notice: Subject to any disclaimer, the term of this patent is extended or adjusted under 35 U.S.C. 154(b) by 9 days.

(21) Appl. No.: 09/885,613

(22) Filed: Jun. 20, 2001

(65) Prior Publication Data

US 2002/0037404 A1 Mar. 28, 2002

(30) Foreign Application Priority Data

Jul. 12, 2000 (DE) .......................... 100 33 716

(51) Int. Cl.$^7$ ............... C09J 7/02; C09J 7/04; B32B 7/12
(52) U.S. Cl. ............... 428/355 AC; 428/343; 428/356; 442/149; 442/151
(58) Field of Search .................. 428/356, 355 AC, 428/343; 442/151, 149; 524/501, 272

(56) References Cited

U.S. PATENT DOCUMENTS

| | | | | |
|---|---|---|---|---|
| 3,937,683 A | * | 2/1976 | Ferrar | 260/42.47 |
| 4,189,419 A | * | 2/1980 | Takemoto et al. | 260/29.7 NR |
| 4,438,232 A | * | 3/1984 | Lee | 524/272 |
| 4,968,740 A | * | 11/1990 | Makati et al. | 524/501 |

FOREIGN PATENT DOCUMENTS

| | | | | |
|---|---|---|---|---|
| EP | 1 078 967 | | 2/2001 | C09J/7/02 |
| EP | 1 103 587 | | 5/2001 | C09J/7/02 |

* cited by examiner

*Primary Examiner*—Daniel Zirker
(74) *Attorney, Agent, or Firm*—Norris McLaughlin & Marcus

(57) ABSTRACT

An adhesive packaging tape comprising a backing and an adhesive composition, wherein the adhesive composition is coated onto the backing as a butadiene/acrylate dispersion having a butadiene content of more than 50% in a blend with resin dispersion and is then dried.

11 Claims, No Drawings

ADHESIVE PACKAGING TAPES

The invention relates to the development of pressure sensitive adhesive tapes based on butadiene/acrylate latices having a high butadiene content and resin dispersions.

In the patent literature there exists a large number of applications on the production of adhesive packaging tapes.

The time honored adhesive composition systems for adhesive packaging tapes are based essentially on natural rubber, styrene block copolymers and polyacrylates.

The natural rubber systems are commonly used as solutions in an aliphatic solvent mixture. Water based natural rubber compositions based on centrifuge latex are likewise known. For the required adhesive properties it is vital to add resins, fillers and aging inhibitors. Crosslinking takes place either chemically by way of added crosslinking agents or physically by way, for example, of electron beam curing.

Synthetic rubbers based on styrene block copolymers have also been described in the past as adhesive compositions for adhesive packaging tapes. These are 100% systems, which, after blending with resins and further coagents, may be applied in the melt state in the absence of solvents or water.

The use of polyacrylates as adhesive compositions for adhesive packaging tapes is likewise known. Besides solutions of polyacrylates, there have also been descriptions in the past of polyacrylate dispersions, which, after compounding with resin dispersions and further coagents, meet the requirements of an adhesive packaging tape composition. Acrylate dispersions exhibit relatively poor tack to cartons, especially when the substrate originates from papers which have been recycled a number of times, which is increasingly the case with packaging cartons. By adding resin dispersions this deficiency can be eliminated. Since natural resin dispersions based on rosin derivatives often have an undesirable influence on the cohesion of acrylate compositions, there is a tendency to use the more cohesive hydrocarbon resin dispersions, which are offered by a variety of resin producers.

Backing materials commonly used for adhesive packaging tapes are monoaxially or biaxially oriented polyolefins, PVC types or papers.

In the pressure sensitive adhesives field, butadiene/styrene latices have been used for many years to impregnate and stabilize backing materials. These backing materials include, primarily, papers, wovens, and nonwovens. Because of the application, the impregnation or coating must in no case be tacky. The butadiene/styrene copolymers used for this application must therefore contain a relatively high fraction of hardening monomers, but on the other hand must include sufficient softening monomer that the copolymer overall remains elastic. Butadiene/styrene latices with a butadiene content of about 25–50% fulfill this requirement very effectively. Depending on the butadiene content, films of these copolymers have an elasticity ranging from moderate to good and are not tacky. Such monomers have been available on the raw materials market for many years now (Butofan® grades from BASF, various grades from Dow and Synthomer). Because of their preparation, such latices and dispersions include emulsifier systems in order to bring about compatibility between the organic phase and the aqueous phase.

In the past, butadiene/styrene copolymers have also been used as base polymers for label compositions. In the labels segment, cohesion is frequently of secondary importance, so that, following compounding with customary tackifiers, weakly adhering systems exhibit properties which are sufficient in many cases.

As a framework polymer for adhesive packaging tape compositions, butadiene/styrene based copolymers with little or no tack are often poorly suited, since they can be made tacky only with considerable quantities of tackifier resins, which in turn is associated with a substantial loss of cohesion. This rules out their use as adhesive compositions for adhesive packaging tapes.

Butadiene/styrene copolymers or butadiene/methyl methacrylate copolymers having a high butadiene content, on the other hand, are of great interest as framework polymers for adhesive packaging tapes.

Butadiene copolymers having a high butadiene content and containing a hard and thus cohesive segment as copolymerization partner are suitable as framework polymers for high performance pressure sensitive adhesive compositions, but exhibit only moderate tack on critical substrates. It is an object of the invention to provide adhesive compositions based on butadiene copolymers which do not have the aforementioned deficiencies and with which it is possible to make a pressure-sensitive adhesive tape which meets the requirements of an adhesive packaging tape.

This object has been achieved through the use of butadiene/acrylate dispersions having a high butadiene content which have been blended with suitable resin dispersions.

The group of the butadiene/acrylate copolymers comprises framework polymers of butadiene and a moderately hard comonomer such as butyl acrylate, for example. Butadiene/acrylate copolymers have markedly lower glass transition points than butadiene/styrene or butadiene/methyl methacrylate copolymers. At a butadiene content of about 75%, the glass transition point may be lowered by about 15° C. to −70° C. by passing from styrene to, for example, butyl acrylate as comonomer.

The compound formulations comprising framework polymer and resin dispersion may be admixed, if desired, with further coagents such as, for example, aging inhibitors or further emulsifiers, in order to improve the protection against aging, or to further adapt the unrolling properties to the application. After the adhesive composition has been coated onto a polymer or paper backing it is possible to obtain a pressure sensitive adhesive tape which entirely meets the requirements of an adhesive packaging tape in respect of tack, bond strength, cohesion, and unrolling properties.

Adhesive compositions:

The copolymerization of butadiene with acrylates such as butyl acrylate, for example, in an aqueous medium provides copolymers which are film forming and which have a glass transition point which is suitable for pressure sensitive adhering. Butadiene/acrylate dispersions are generally stabilized by incorporating small amounts of carboxyl-containing groups, which at the same time improves the adhesion to many substrates.

As adhesive compositions for the invention it is possible in particular to use carboxylated butadiene/acrylate copolymer dispersions having a butadiene fraction of 50–95%, preferably 60–85%, based on the overall butadiene and acrylate solids fraction, which in a mixture with resin dispersions exhibit outstanding suitability as adhesive compositions for adhesive packaging tapes. Carboxylated copolymers of this kind contain in particular below 10%, preferably below 5%, based on the monomer content, of carboxyl-containing comonomer, especially acrylic acid, in the copolymer.

Butadiene/acrylate dispersion types of the invention having a butadiene content >60% are available, for example, from Dow.

As the resin component it is possible to use not only dispersions of synthetic resins (e.g. hydrocarbon resins, terpene phenolic resins, etc.) but also natural resin dispersions (e.g., rosin derivatives, polyterpenes etc.).

Owing to their high cohesion, there is a distinct preference for hydrocarbon resin dispersions. The melting point of the base resins should be situated in the range 50–120° C., preferably 60–100° C. Based on the overall solids content in terms of butadiene/acrylate copolymer and resin, the resin fraction should be situated in the range 5–60%, preferably 10–40%. To tailor the adhesive properties it is also possible to use mixtures of different resins. To improve the aging behavior it is possible to add dispersions of customary aging inhibitors which are well known from the field of elastomers.

Furthermore, as and when required, it is possible to add further additives to modify the product properties, such as fillers, soft resins, oils or emulsifiers, for example, of the alkoxylated alkylphenol type. Using these additives it is possible to exert the desired influence over the unrolling properties.

The setting of the adhesion/cohesion balance may be done by chemical crosslinking, by way of the carboxyl groups present, by means of added crosslinking agents such as aluminum or titanium chelate, for example. In contrast to what is the case with many styrene block copolymers, radiation crosslinking is likewise possible owing to the sufficiently high molecular weight.

An overview of possible resin dispersions is given in Donatas Satas, *Handbook of Pressure Sensitive Adhesive Technology*, 2nd Edition Resin Dispersion by Anne Z. Casey, pp. 545–566.

Resin dispersions of the invention are obtainable, for example, through Hercules (NL).

The adhesive application rate is 10–120 g/m$^2$, preferably 15–40 g/m$^2$.

Backing materials:

Backing materials suitable for the invention are the backing materials customary for packaging applications. That is, essentially, films and papers whose properties and the production and/or aftertreatment process give them the requisite mechanical properties.

In the case of the films, those involved are substantially polyethylene, polypropylene, polyvinyl chloride, and other polymers and copolymers customary for the application, which may be used in either one or more layers. In the case of multilayer systems there may also be variation in the composition and thickness of the individual layers.

Monoaxially and biaxially oriented polypropylenes are frequently used for adhesive packaging tapes, strapping tapes and other adhesive tapes where a defined tensile strength is of not inconsiderable importance.

Monoaxially oriented polypropylenes exhibit particularly good tensile strength and little extension in the machine direction. Backing materials of this kind are frequently used for strapping applications.

In order to achieve uniform strength values in the machine and cross directions, the films must be oriented biaxially.

Both monoaxially and biaxially oriented polypropylenes and polyethylenes are particularly suitable as backing material for the invention. The stretch ratios are guided by the particular requirements.

Both blown film and flat film may be used.

The thicknesses of the films are between 10 and 250 $\mu$m, preferably between 20 and 120 $\mu$m.

In order to ensure sufficient adhesion of the adhesive composition to the backing material, the surface energy of the side to be coated must be situated within a defined range. This may be ensured either by way of an additional coating with a primer or by way of a surface treatment. Preference is given to a corona or flame pretreatment with which the desired surface energies may be achieved. The surface energies should be situated within a range of 25–50 mN/m, preferably 30–45 mN/m.

Suitable backing materials further include impregnated and highly sized papers with a defined crepe and having tensile strengths which satisfy the desired requirements. Depending on the desired application, it is possible to use not only papers having higher machine-direction than cross-direction extensibility but also papers having higher cross-direction than machine-direction extensibility, both in bleached form and in the environmentally friendly unbleached form.

All percentages are by weight.

EXAMPLES

Example 1

A dispersion adhesive composition consisting of 65% of a carboxylated butadiene/acrylate dispersion having a butadiene content >50% (XZ 91861.00, butadiene/acrylate dispersion from Dow) and 35% Tacolyn 1070 (hydrocarbon resin dispersion from Hercules) is coated continuously with a film thickness of 25 g/m$^2$ onto a 35 mN/m corona pretreated BOPP film 30 $\mu$m thick, using a wire doctor. The percentages are based on the solids content.

Technical conditions:

| | |
|---|---|
| Machine: | Pilot plant coating unit |
| Applicator: | Wire doctor |
| Backing web speed: | 3.5 m/min |

The coated material is subsequently dried by means of heat:

| | |
|---|---|
| Drying (suspension nozzle dryer): | Zone 1: 80° C. |
| | Zone 2: 85° C. |

The bale material is then cut into rolls.

Technical data (fresh state):

Bond strength/steel: 1.60 N/cm
Microshear path (40° C., 3 N): 45 $\mu$m
Thermoshear path (5° C./min, 3 N): 78° C.

Example 2

A dispersion adhesive composition consisting of 75% of a carboxylated butadiene/acrylate dispersion having a butadiene content >50% (XZ 91861.00, butadiene/acrylate dispersion from Dow) and 25% Tacolyn 1070 (hydrocarbon resin dispersion from Hercules) is coated continuously with a film thickness of 25 g/m$^2$ onto a 35 mN/m corona pretreated BOPP film 30 $\mu$m thick, using a wire doctor. The percentages are based on the solids content.

Technical conditions:

| | |
|---|---|
| Machine: | Pilot plant coating unit |
| Applicator: | Wire doctor |
| Backing web speed: | 3.5 m/min |

-continued

| |
|---|
| The coated material is subsequently dried by means of heat: |
| Drying (suspension nozzle dryer):     Zone 1: 80° C. |
|     Zone 2: 85° C. |
| The bale material is then cut into rolls. |
| Technical data (fresh state): |
| |
| Bond strength/steel: 1.2 N/cm |
| Microshear path (40° C., 3 N): 35 μm |
| Thermoshear path (5° C./min, 3 N): 80° C. |

What is claimed is:

1. An adhesive packaging tape comprising a backing and an adhesive composition, wherein the adhesive composition is coated onto the backing as a butadiene/acrylate dispersion having a butadiene content of more than 50% in a blend with a resin dispersion and is then dried.

2. The adhesive packaging tape as claimed in claim 1, wherein the resin dispersion is a hydrocarbon resin dispersion with a softening point of the base resin of between 50 and 120° C.

3. The adhesive packaging tape as claimed in claim 1, wherein the resin dispersion is a mixture of two or more hydrocarbon resin dispersions or a mixture of hydrocarbon resin dispersions with natural resin dispersions.

4. The adhesive packaging tape as claimed in claim 1, wherein the adhesive composition is chemically crosslinked by means of added crosslinkers.

5. The adhesive packaging tape as claimed in claim 1, wherein the adhesive composition is physically crosslinked.

6. The adhesive packaging tape as claimed in claim 1, wherein the backing is selected from the group consisting of an oriented or unoriented polyolefin having a film thickness of between 20 and 120 μm, PVC or a paper.

7. The adhesive packaging tape as claimed in claim 1, wherein the application rate of the adhesive composition is 10–120 $g/m^2$.

8. The adhesive packaging tape as claimed in claim 1, wherein, to improve the anchoring of the composition, the backing has been physically surface treated or pretreated with a primer.

9. The adhesive packaging tape as claimed in claim 1, wherein the butadiene/acrylate dispersion is a carboxylated butadiene/acrylate dispersion.

10. The adhesive packaging tape as claimed in claim 1, wherein the resin fraction is 5–60% by weight, based on the overall solids content.

11. The method for bonding paper or cardboard packages, which comprises bonding said packages with the adhesive packaging tape of claim 1.

* * * * *